United States Patent [19]

Havas

[11] 4,037,044
[45] July 19, 1977

[54] POWER CONTROL SYSTEM FOR SINGLE PHASE INDUCTION MELTING OR HEATING FURNACE

[75] Inventor: George Havas, Youngstown, Ohio

[73] Assignee: Ajax Magnethermic Corporation, Warren, Ohio

[21] Appl. No.: 601,644

[22] Filed: Aug. 4, 1975

[51] Int. Cl.² .......................... H05B 1/02; H05B 5/04
[52] U.S. Cl. ........................................................ 13/26
[58] Field of Search ........................ 13/26; 219/10.75; 323/24

[56] References Cited

U.S. PATENT DOCUMENTS

| | | | |
|---|---|---|---|
| 3,500,174 | 3/1970 | Ellerbeck | 323/24 |
| 3,648,151 | 3/1972 | Gurwicz | 323/24 |
| 3,764,890 | 10/1973 | Caen | 323/24 |
| 3,821,456 | 6/1974 | Havas | 13/26 |

Primary Examiner—R. N. Envall, Jr.

[57] ABSTRACT

There is disclosed herein a circuit for controlling the voltage and power delivered to a single phase induction melting or heating furnace wherein the impedance of the furnace varies. The circuit utilizes diode rectifier means and controlled rectifier means connected in series with capacitance and achieves transient-free and harmonic-free power control.

5 Claims, 6 Drawing Figures

POWER CONTROL SYSTEM FOR SINGLE PHASE INDUCTION MELTING OR HEATING FURNACE

This invention relates to improved power control means particularly adapted for use in single phase induction heating or melting furnaces operated at line frequency.

The present invention relates to improvements in power control means disclosed in U.S. Pat. No. 3,821,456 dated June 28, 1974, to this inventor.

The present invention is, as is the previous patented invention, particularly applicable for use with furnace loads whose impedance, both resistance and reactance, changes greatly throughout a work cycle.

It is an object of this invention to provide improvements in system durability, simiplicity and reliability as well as economy.

It is a further object of this invention to improve the power control means for furnaces of the type referred to and to achieve power control in a virtually stepless manner.

Another object of this invention is to achieve power control in a harmonic-free manner without the use of additional filtering.

A still further object of this invention is to achieve power control in a transient-free manner.

Other objects of my invention and the invention itself will become more readily apparent from the purview of the drawings and description in which drawings.

Figure 3:
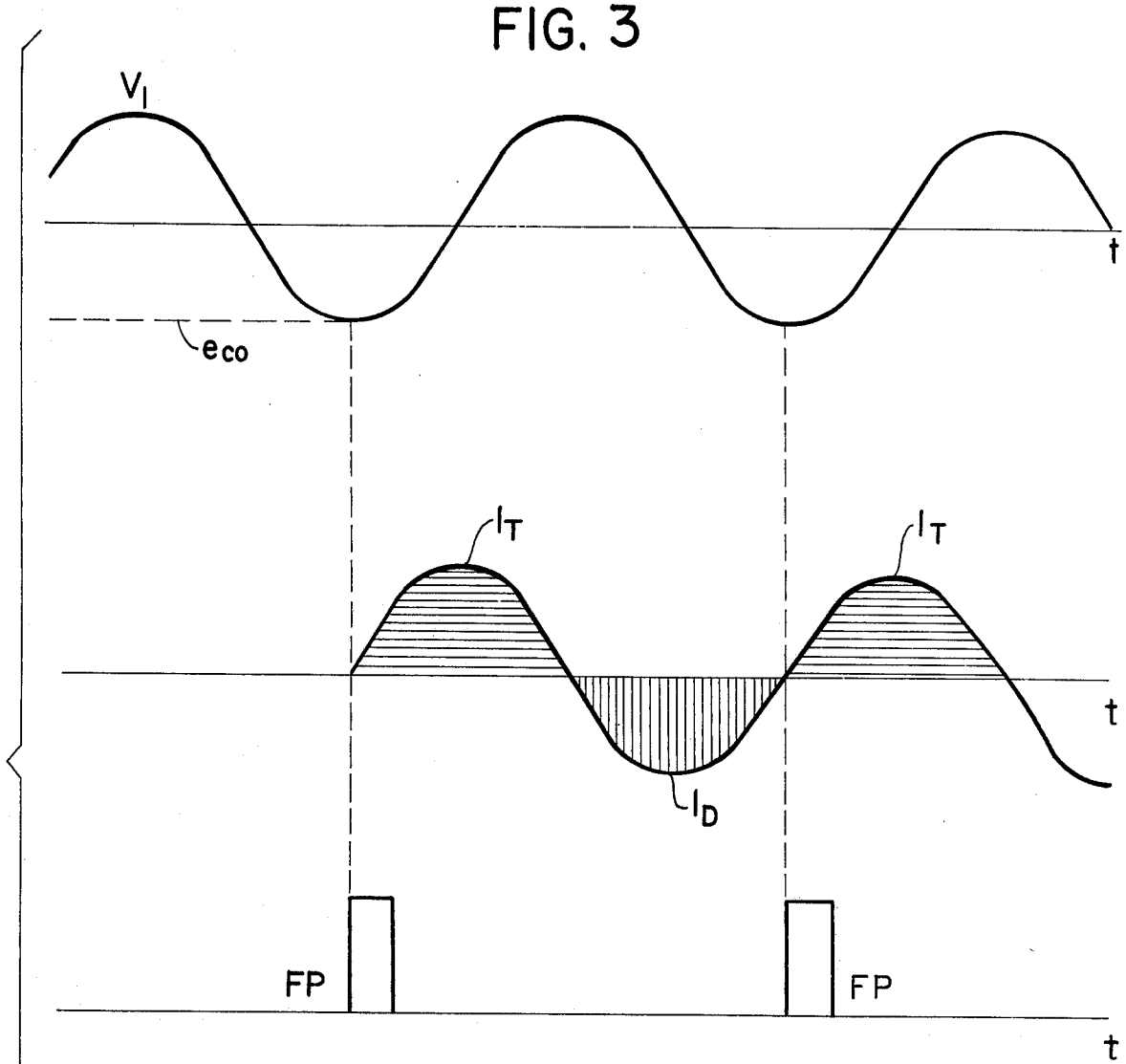
Figure 6:
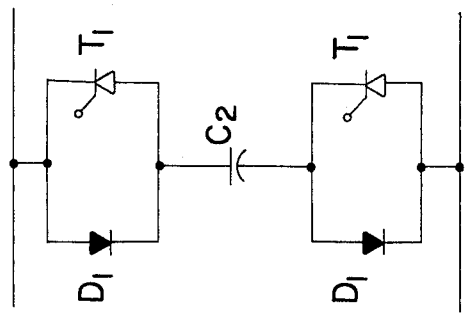
Figure 5:
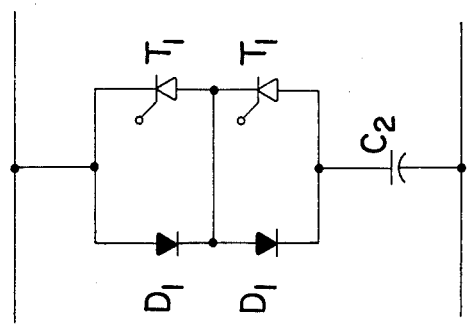
Figure 4:
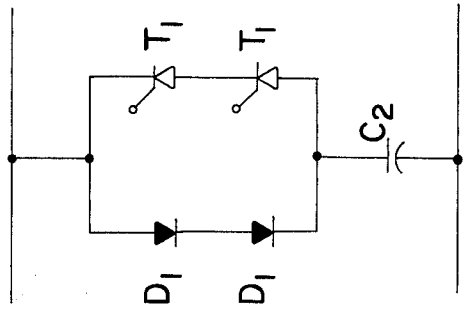

FIG. 3 shows the voltage $V_1$ across a set, the initial voltage $e_{co}$ across the capacitance within the set, firing pulse FP, the current through the diode rectifier means $D_1$ and the current through the controlled rectifier means $T_1$ at the time of initiation of conduction of the selected controlled rectifier means and subsequently the continued harmonic-free alternating current flow thereafter;

FIGS. 4, 5 and 6 illustrate a few of the various alternate ways in which the diode rectifier means and controlled rectifier means may be connected within a set.

Figure 1:
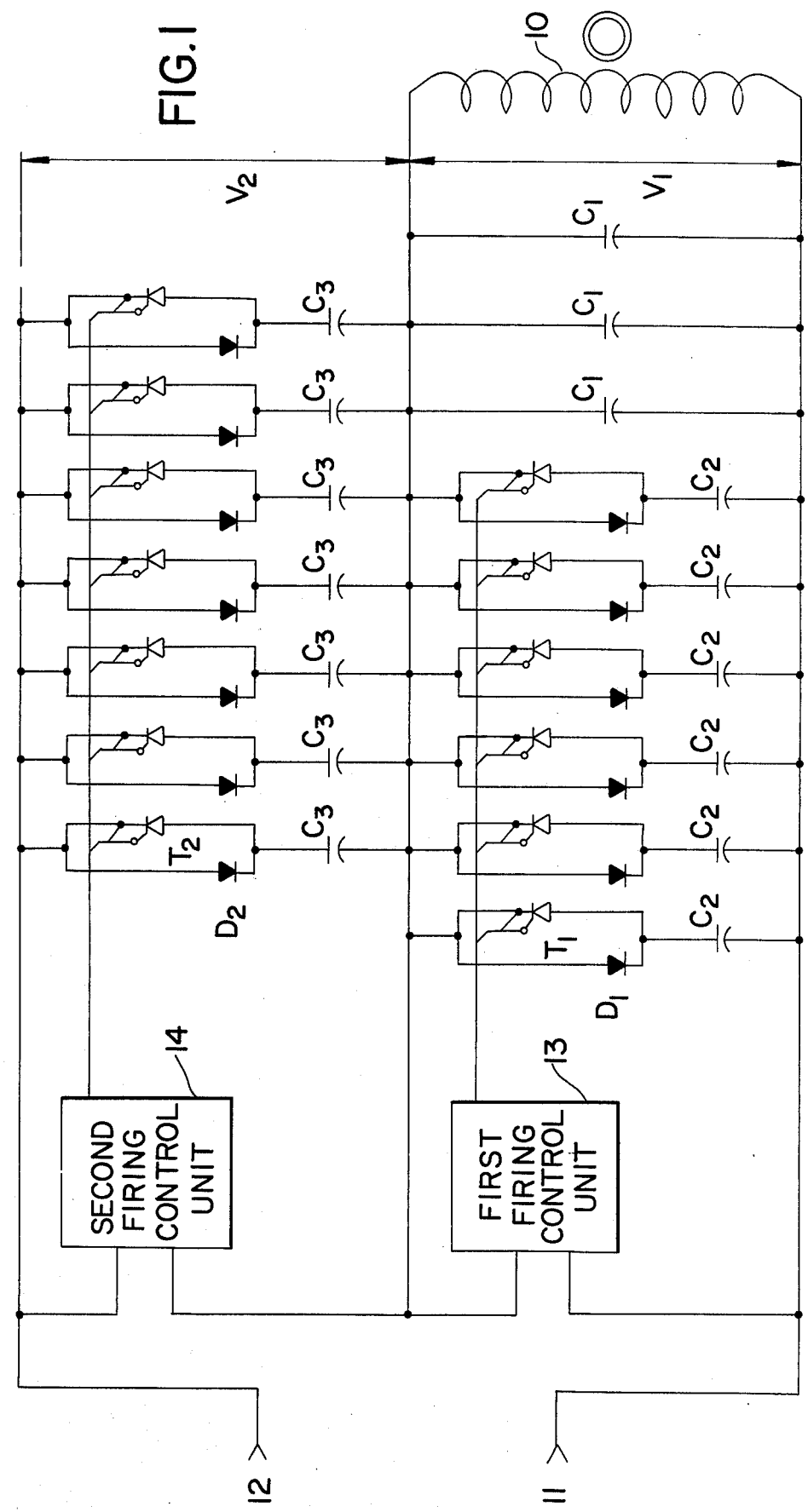
FIG. 1 shows the schematic diagram of a circuit of my invention including a first and a second firing control unit for controlling the power to be delivered to a single phase heating or melting induction furnace.

Referring now to the drawings, in all of which like parts are designated by like reference characters, in FIG. 1 a form of the circuit of the system of my invention is illustrated. It consists of an induction heating or melting furnace 10 which is connected to one side 11 of a single phase line frequency alternating current supply, and power control means for said induction furnace comprising: A first group consisting of capacitance $C_1$ connected in parallel permanently with said induction furnace 10, and capacitance $C_2$ which can be connected across the induction furnace load as needed, by means of the selected diode rectifier means $D_1$ and controlled rectifier means $T_1$; a second group consisting of capacitance $C_3$ which can be connected in series between the induction furnace load 10 and the other side of the supply line, 12, as desired, by means of selected diode rectifier means $D_2$ and controlled rectifier means $T_2$. Also shown in FIG. 1 are the first and the second firing control units, 13, 14 which provide control signals to intiate the conduction of the controlled rectifier means $T_1$ and $T_2$.

In many applications the induction heating or melting load represents a widely varying impedance to the power control means during a work cycle. The importance of controlling the magnitude of the operating voltages appearing across the load as well as across the capacitance and the diode rectifier means and controlled rectifier means used in the circuit cannot be emphasized enough both for economic and safety reasons. In actual operation the capacitances $C_1$ and $C_2$ which are connected in parallel with the induction heating or melting load 10 are utilized to determine the safe operating conditions under which the control system can be operated. Once these safe operating conditions are obtained, a virtually stepless control of the power to be delivered to the induction furnace load can be obtained by connecting the appropriate amount of capacitance $C_3$ in series between the supply line 12 and the furnace load 10. A preferred range of operation is obtained when the phase angle between voltages $V_1$ and $V_2$ remains between 120° and 150°.

In practice I have found that it is most desirable to hold the system voltages within predetermined limits while controlling or regulating the power delivered to the load automatically.

Figure 2:
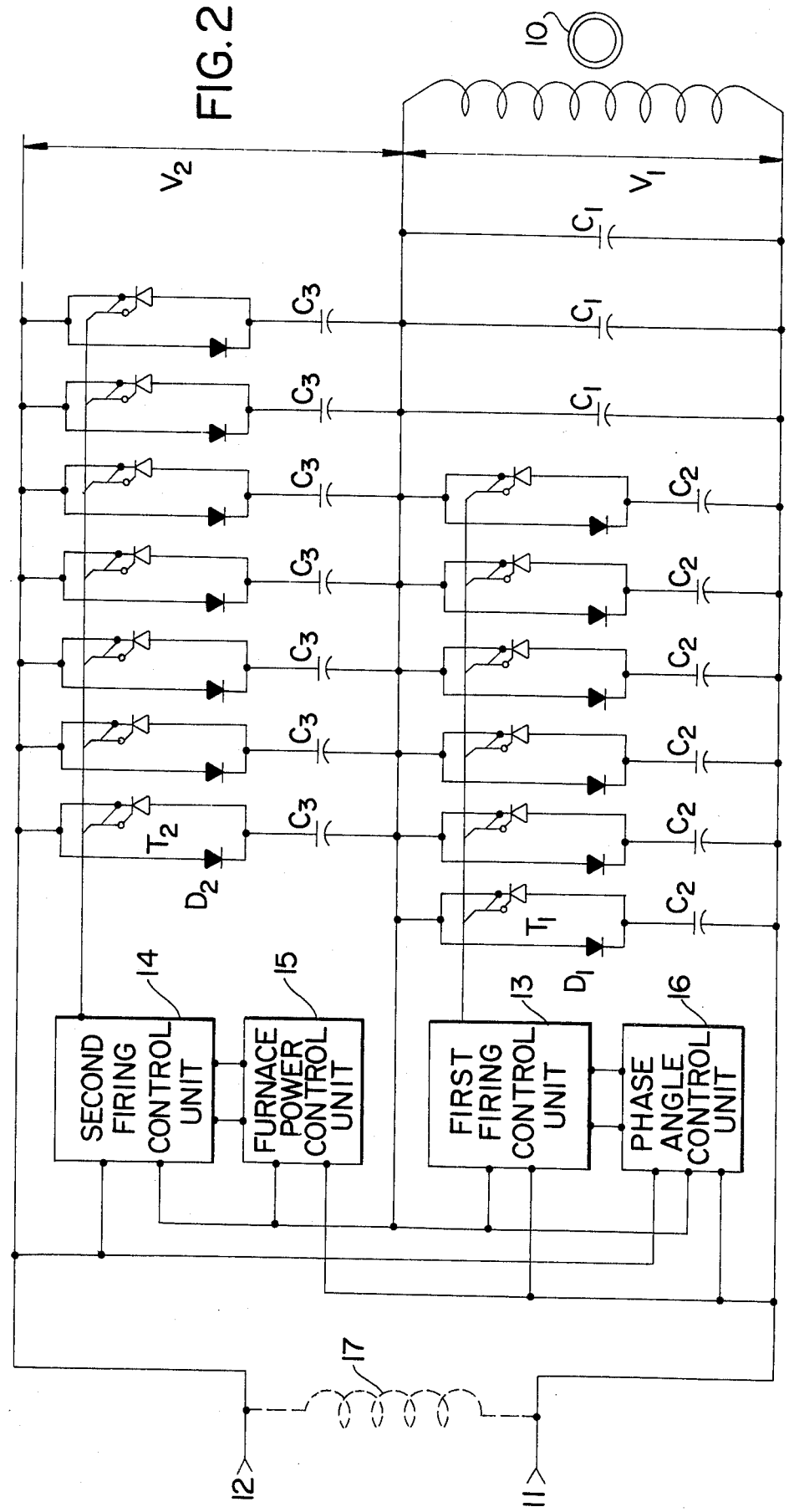
FIG. 2 shows a modification of the circuit shown in FIG. 1 wherein the first and second firing control units are actuated by a phase angle control unit and a furnace power control unit respectively and an optional reactance is shown across the supply lines.

FIG. 2 illustrates a preferred modification of my invention, the control means in such circuit comprising a phase angle control unit 16 and a furnace power control unit 15 added to the circuit shown in FIG. 1. The function of the phase angle control unit 16 is to maintain precisely and automatically a constant phase angle between the voltages $V_1$ and $V_2$ for an induction heating or melting load whose impedance varies during a work cycle, by adjusting the value of the capacitance $C_2$ connected in parallel with said load. The function of the furnace power control unit 15 is to adjust precisely and automatically the value of the capacitance $C_3$ connected in the circuit in series between the supply line 12 and induction furnace load 10 so as to maintain or regulate the power delivered to said load. The actual connection of the proper amount of capacitance $C_2$ and $C_3$ into the circuit is achieved by selectively rendering conductive the appropriate controlled rectifier means $T_1$ and $T_2$.

Reactance 17 can be connected across the single phase alternating current lines 11 and 12 so a reduction of the leading current drawn from the lines under controlled mode of operation can be effected if desired.

Considerable information is available in the literature where anit-parallel connected silicon controlled rectifiers are utilized for the control of power to single phase loads of various configurations. A great disadvantage of this type of control is the inherent harmonic or subharmonic pollution it causes in the supply lines if unfiltered.

A harmonic-free power control means for induction furnaces comprising combinations of sets of controllable semiconductor means connected in series with capacitance has been disclosed in my U.S. Pat. No. 3,821,456 referred to above. In utilizing the power control means of my previous invention in applications where large amounts of electrical power must be controlled to an induction heating or melting load, the initial starting transients disclosed in said patent can cause high frequency oscillations necessitating the use of additional protective circuitry or derating of the semiconductor means within a set.

The present invention, utilizing sets comprising diode rectifier means connected to conduct current only in one direction and controlled rectifier means connected in parallel therewith to conduct current only in an opposite direction and capacitance in series therewith, eliminates such transient currents.

A complete understanding of the functioning of the new combination of elements within a set can be obtained by observing the time relationship of the voltage $V_1$ across a selected set, the initial voltage $e_{co}$ across the capacitance $C_2$, the current $I_D$ through the diode rectifier means $D_1$, the current $I_T$ through the controlled rectifier means $T_1$, and the firing pulses FP at the time current flow is initiated, and continuing thereafter, as shown in FIG. 3. Note that when the set is not in conduction the initial voltage $e_{co}$ across the capacitance $C_2$ is maintained at the maximum value of $V_1$ by the diode rectifier means $D_1$. No alternating current can flow through the set however until the controlled rectifier means $T_1$ is rendered conductive. Conduction is initiated by rendering the controlled rectifier means $T_1$ conductive precisely at the instant when the voltage $V_1$ across the set attains its maximum value of like polarity as the initial voltage $e_{co}$ across capacitance $C_2$. The result is a completely transient and harmonic-free alternating current through the set from the time of initiation of conduction and thereafter.

It is extremely important to control the instant of gating of the controlled rectifier means precisely if transient-free and harmonic-free currents are to be maintained in the set. In practice, because of the high voltage and current requirements of a high powered induction heating or melting furnace load, to increase the current and/or the voltage capability of the diode rectifier means and the controlled rectifier means within a set, series and/or parallel connection of individual diode rectifiers as well as controlled rectifiers is required. It is particularly important in most practical cases to connect several diode rectifiers in series and several controlled rectifiers in series within each set.

FIG. 4 illustrates a possible connection for my improved combination of new elements in a set: Two diode rectifiers $D_1$ are connected in series to conduct current only in one direction and two series connected controlled rectifiers $T_1$ are connected in parallel therewith to conduct current only in an opposite direction. In series with this parallel connected combination of series connected diode rectifiers and series connected controlled rectifiers is connected capacitance $C_2$, forming a set. The number and size of the diode rectifiers which are connected in series in a string must not necessarily be equal to the number and size of the controlled rectifiers connected in series in a string and connected in parallel with said diode rectifiers.

FIG. 5 illustrates another modification of the improved combination of my invention. Two diode rectifiers $D_1$ are connected in series in a string, all connected to conduct current only in one direction. In parallel with and across each of said series connected diode rectifiers there is connected a controlled rectifier $T_1$, to conduct current only in an opposite direction. Said combination of diode rectifiers and controlled rectifiers is connected in series with capacitance $C_2$, to form a set. The number and size of the series connected diode rectifiers and controlled rectifiers used within a set is dependent on circuit considerations.

FIG. 6 shows another possible combination of my invention where capacitance $C_2$ is connected between two diode rectifiers $D_1$. Each of said diode rectifiers is connected to conduct current in only one direction. Parallel with each said diode rectifier is connected a controlled rectifier to conduct current only in an opposite direction, to form a set.

Note that all the diode rectifiers within a set in each of the above discussed figures are connected to conduct current only in one direction and all the controlled rectifiers within a set are connected to conduct current only in an opposite direction. The fact that all the diode rectifiers within a set are connected to conduct current only in one direction ensures that the initial voltage $e_{co}$ present at the initiation of the conduction of the selected controlled rectifiers is substantially of the same magnitude as the maximum value of the ac voltage $V_1$ appearing across the set. Hence, if the circuit of either FIG. 5 or FIG. 6 one would reverse the direction in which the upper diode rectifiers and controlled rectifiers would conduct within a set, the transient-free operation taught in my present invention would not be realizable, because the initial voltage across the capacitance could not be held at the maximum value of the ac voltage appearing across the set at the time of initiation of conduction of the set. The operation of such connection would result in transients such as the ones occurring at the initiation of conduction of a set as shown in FIG. 3 of my previous U.S. Pat. No. 3,821,456.

It is to be understood that whenever a "set" within the meaning of this invention is referred to, it shall comprise diode rectifier means connected to conduct current only in one direction and controlled rectifier means connected in parallel therewith to conduct current only in an opposite direction, and capacitance connected in series therewith. This novel combination of elements forming each set, as disclosed and claimed herein, enables the system to operate in a completely transient-free manner as amply demonstrated by the wave shapes shown in FIG. 3 and with better utilization of the semiconductor means within said set or sets.

What I claim is:

1. Power control means for a single phase induction melting or heating furnace for operation from a normal line frequency power supply, one line of said power supply being connected to the first terminal of said furnace, said power control means comprising capacitance and a first group of sets of series connected capacitance and semiconductor means all connected in parallel with said furnace and a second group of sets of series connected capacitance and semiconductor means connected in parallel and interposed between another line in said power supply and the second terminal of said furnace, each said semiconductor means within each set of said first and second group comprising diode rectifier means connected to conduct current only in one direction and controlled rectifier means connected in parallel therewith to conduct current only in an opposite direction, said controlled rectifier means of said first group being actuated by a first firing control means adapted to control the transition of each such controlled rectifier means from the non-conducting to the conducting state, the number and size of sets conducting within said first group determining the total amount of capacitance connected in parallel with said furnace and the phase angle between the furnace voltage and the voltage across said second group of sets thereby setting the range of voltage and power available to said furnace, said controlled rectifier means of said second group being actuated by a second firing control means adapted to control the transition of each such controlled rectifier means from the non-conducting to the conducting state, the number and size of sets conducting within said second group determining the total amount of capacitance effectively interposed between said other power supply line and said second furnace terminal, thereby controlling the voltage and power delivered to said furnace within the selected range as set by said phase angle.

2. Power control means as claimed in claim 1 wherein the conduction of said controlled rectifier means within each selected set when required is initiated substantially at the instant when the voltage across said set attains its maximum value of like polarity as that of the voltage across the capacitance of said set prior to initiation of conduction and wherein conduction of said set is maintained continuously thereafter to produce a transient-free and harmonic-free alternating current in said set until deenergized.

3. Power control means as claimed in claim 1 wherein the total amount of capacitance in parallel with said furnace is such that the phase angle between the furnace voltage and the voltage across said second group of sets remains between 120° and 150°.

4. Power control means as claimed in claim 1 wherein the total amount of capacitance in parallel with said furnace is controlled so as to maintain a constant phase angle between the furnace voltage and the voltage across the second group of sets while changes occur in the furnace impedance.

5. Power control means as claimed in claim 1 wherein an inductive reactance is connected across the input terminals to provide an improved line power factor.

* * * * *